US008908047B2

(12) United States Patent
Sun et al.

(10) Patent No.: US 8,908,047 B2
(45) Date of Patent: **\*Dec. 9, 2014**

(54) METHOD AND APPARATUS FOR OBTAINING VIDEO QUALITY PARAMETER, AND ELECTRONIC DEVICE

(71) Applicant: Huawei Technologies Co., Ltd., Shenzhen (CN)

(72) Inventors: Lina Sun, Shenzhen (CN); Qingpeng Xie, Shenzhen (CN); Dong Li, Xi'an (CN); Fuzheng Yang, Xi'an (CN); Liang Zhou, Shenzhen (CN); Chang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,978

(22) Filed: Apr. 29, 2014

(65) Prior Publication Data

US 2014/0232878 A1    Aug. 21, 2014

Related U.S. Application Data

(63) Continuation of application No. 13/354,614, filed on Jan. 20, 2012, which is a continuation of application No. PCT/CN2010/076175, filed on Aug. 20, 2010.

(30) Foreign Application Priority Data

Aug. 21, 2009 (CN) .......................... 2009 1 0091495

(51) Int. Cl.
*H04N 17/00* (2006.01)
*H04N 17/02* (2006.01)

(52) U.S. Cl.
CPC ............. *H04N 17/00* (2013.01); *H04N 17/004* (2013.01)
USPC ........... 348/180; 348/181; 348/177; 348/178; 348/158; 348/155; 348/137; 348/122; 348/208.15; 348/317; 348/78; 348/77; 348/14.12; 348/14.14; 348/14.15; 348/439.1; 348/441; 348/456; 348/490; 348/513; 348/569; 375/240.01; 375/240.02; 375/240.08

(58) Field of Classification Search
USPC ........... 348/180, 181, 155, 137, 158, 78, 122, 348/441, 439.1, 569, 14.15, 208.15, 14.12, 348/14.14, 177, 178, 317, 77, 456, 490, 348/513; 375/240.01, 240.02, 240.08
See application file for complete search history.

(56) References Cited

U.S. PATENT DOCUMENTS 7,702,014 B1 * 4/2010 Kellock et al. ........... 375/240.08
8,094,725 B2 * 1/2012 Nakahara et al. ........ 375/240.24

(Continued)

FOREIGN PATENT DOCUMENTS

| CN | 1809175 A | 7/2006 |
| CN | 101312544 A | 11/2008 |
| WO | 2004114216 A | 12/2004 |

OTHER PUBLICATIONS

Barkowsky, Marcus, et al., "Temporal Trajectory Aware Video Quality Measure," IEEE Journal of Selected Topics in Signal Processing, vol. 3, No. 2, Apr. 2009, pp. 266-279.

(Continued)

*Primary Examiner* — Jefferey Harold
*Assistant Examiner* — Mustafizur Rahman
(74) *Attorney, Agent, or Firm* — Slater & Matsil, L.L.P.

(57) ABSTRACT

Embodiments of the present invention disclose a method and an apparatus for obtaining a video quality parameter and an electronic device. The method includes dividing a target video segment into at least one video subsegment, where duration of every video subsegment is at least time perceivable by human eyes; obtaining a video quality parameter of the video subsegment; and processing the video quality parameter of the video subsegment, and obtaining a video quality parameter of the target video segment.

20 Claims, 5 Drawing Sheets

(56) References Cited

U.S. PATENT DOCUMENTS

| | | | | |
|---|---|---|---|---|
| 8,330,874 | B2* | 12/2012 | Yamamoto | 348/732 |
| 8,359,303 | B2* | 1/2013 | Du et al. | 707/706 |
| 2007/0058727 | A1* | 3/2007 | Nakahara et al. | 375/240.24 |
| 2008/0007650 | A1* | 1/2008 | Bennett | 348/443 |
| 2008/0007651 | A1* | 1/2008 | Bennett | 348/443 |
| 2008/0018784 | A1* | 1/2008 | Bennett | 348/439.1 |
| 2008/0018785 | A1* | 1/2008 | Bennett | 348/439.1 |
| 2008/0068997 | A1* | 3/2008 | Krause et al. | 370/232 |
| 2009/0046995 | A1 | 2/2009 | Kanumuri et al. | |
| 2009/0116713 | A1 | 5/2009 | Yan et al. | |

OTHER PUBLICATIONS

European Search Report received in European Application No. 10809575.3-2202, mailed Jun. 11, 2012, 10 pages.

International Search Report and Translation received in the Patent Cooperation Treaty Application No. PCT/CN2010/076175, mailed Nov. 25, 2010, 6 pages.

Li, Qiang, et al., "Video Quality Assessment by Incorporating a Motion Perception Model," IEEE International Conference on Image Processing (ICIP), Arlington, Texas, Sep. 16-Oct. 19, 2007, pp. II-173-II-176.

Notice of Allowance received in U.S. Appl. No. 13/354,614 mailed Jan. 24, 2014, 17 pages.

Partial Translation of Second Chinese Office Action of Chinese Application No. 200910091495.2 mailed Jul. 20, 2012; 8 pages.

Pinson, Margaret H., "A New Standardized Method for Objectively Measuring Video Quality," IEEE Transactions on Broadcasting, vol. 50, No. 3, Sep. 2004, pp. 312-322.

Rapporteur, Final Report from the Video Quality Experts Group on the Validation of Objective Models of Video Quality Assessment, International Telecommunication Union, Jun. 2000, 125 pages.

Rimac-Drlje, Snjezana, et al., "Influence of Temporal Pooling Method on the Objective Video Quality Evaluation," IEEE International Symposium on Broadband Multimedia Systems and Broadcasting, May 13, 2009, 6 pages.

Rohaly, Ann Marie, et al., "Comparison of Temporal Pooling Methods for Estimating the Quality of Complex Video Sequences," The International Society for Optical Engineering SPIE, vol. 3644, Jan. 1999, pp. 218-225.

Third Office Action of Chinese Application No. 200910091495.2 mailed Feb. 28, 2013, 6 pages. (Partial Translation).

United States Office Action received in Application No. 13/354,614 mailed Oct. 2, 2014, 26 pages.

Wang, et al., "Video Quality Assessment Based on Structural Distortion Measurement," Signal Processing: Image Communication, vol. 19, No. 1, Jan. 2004, 9 pages.

Written Opinion of the International Searching Authority and Translation received in Patent Cooperation Treaty Application No. PCT/CN2010/076175, mailed Nov. 25, 2010, 8 pages.

* cited by examiner

METHOD AND APPARATUS FOR OBTAINING VIDEO QUALITY PARAMETER, AND ELECTRONIC DEVICE

This application is a continuation of U.S. patent application Ser. No. 13/354,614, filed on Jan. 20, 2012, which is a continuation of International Application No. PCT/CN2010/076175, filed on Aug. 20, 2010, which claims priority to Chinese Patent Application No. 200910091495.2, filed on Aug. 21, 2009, both of which are hereby incorporated by reference in their entireties.

TECHNICAL FIELD

The present invention relates to video technologies, and in particular, to a method and an apparatus for obtaining a video quality parameter, and an electronic device.

BACKGROUND

With the development of a network technology, video on demand, Web TV, and videophone have become main services of a broadband network. With the rapid development of video application, to evaluate quality of videos conveniently and effectively is a problem that urgently needs to be solved in the video application. Video quality evaluation may be divided into two kinds, namely, subjective video quality evaluation and objective video quality evaluation. The subjective video quality evaluation is performed by experienced personnel, and the objective video quality evaluation obtains an evaluation result through various algorithms without the participation of people. The video quality is ultimately perceived by a user. Therefore, the subjective video quality evaluation method is an accurate evaluation method. However, because of the participation of people, the subjective video quality evaluation method may cause problems such low efficiency.

To solve the problems caused by the subjective video quality evaluation method, many objective video quality evaluation methods are put forward. Evaluation results of various objective video quality evaluation methods needs to be close to an evaluation result of the subjective video quality evaluation method. An existing method for evaluating video quality of a video sequence is described as follows. A quality score of each video frame is first calculated, and then a quality score of the video sequence is obtained according to the quality score of the video frame. In obtaining the quality score of the video sequence according to the quality score of the video frame, a first method is to average quality scores of all video frames in the video sequence, and use an average value as the score of the video sequence and a second method is to use an average value of quality scores of N video frames that have the lowest scores in the video sequence as the score of the video sequence.

In the process of implementing the present invention, the inventor finds at least the following problems in the prior art. The currently-adopted video sequence quality evaluation method uses the video frame as a unit, and may be quite different from the subjective video quality evaluation method, which makes the evaluation result not accurate enough.

SUMMARY OF THE INVENTION

Embodiments of the present invention provide a method and an apparatus for obtaining a video quality parameter, and an electronic device to improve accuracy of video quality evaluation.

An embodiment of the present invention provides a method for obtaining a video quality parameter. A target video segment is divided into at least one video subsegment. The duration of each video subsegment is at least time perceivable by human eyes. A video quality parameter of the video subsegment is determined and the video quality parameter of the video subsegment is processed to obtain a video quality parameter of the target video segment.

An embodiment of the present invention provides an apparatus for obtaining a video quality parameter. The apparatus includes a number of modules. A dividing module is configured to divide a target video segment into at least one video subsegment. The duration of each video subsegment is at least time perceivable by human eyes. A segment quality obtaining module is configured to obtain a video quality parameter of the video subsegment. A sequence quality obtaining module is configured to process the video quality parameter of the video subsegment to obtain a video quality parameter of the target video segment.

An embodiment of the present invention provides an electronic device includes a transceiver apparatus and the foregoing video quality parameter obtaining apparatus, where the transceiver apparatus is configured to execute at least one item of the following items: sending a target video segment and receiving a video quality parameter of the target video segment.

It can be known from the foregoing technical solutions that, because human eyes perceive video quality by using the video segment as a unit, according to the embodiments of the present invention, the target video segment is divided into multiple video subsegments, and the duration of each video subsegment is at least the time perceivable by human eyes. Therefore, using the video subsegment as the unit for calculation is in line with the perception mechanism of human eyes and improves accuracy of video quality evaluation.

BRIEF DESCRIPTION OF THE DRAWINGS

To illustrate the technical solutions according to the embodiments of the present invention or in the prior art more clearly, accompanying drawings required for describing the embodiments or the prior art are briefly introduced in the following. Apparently, the accompanying drawings described below are merely some embodiments of the present invention, and persons of ordinary skill in the art may further obtain other drawings from these accompanying drawings without creative efforts.

DETAILED DESCRIPTION OF ILLUSTRATIVE EMBODIMENTS

Technical solutions according to the embodiments of the present invention are clearly and completely described with reference to the accompanying drawings in the embodiments of the present invention. Evidently, the embodiments to be described are merely part of rather than all of the embodiments of the present invention. Based on the embodiments of the present invention, all other embodiments obtained by those of ordinary skill in the art without creative efforts shall fall within the protection scope of the present invention.

To make an objective video quality evaluation method closer to a subjective video quality evaluation method, an embodiment of the present invention provides a method and an apparatus for obtaining video quality, where the method and the apparatus for obtaining video quality are in line with perception features of human eyes and visual characteristics.

Figure 1:
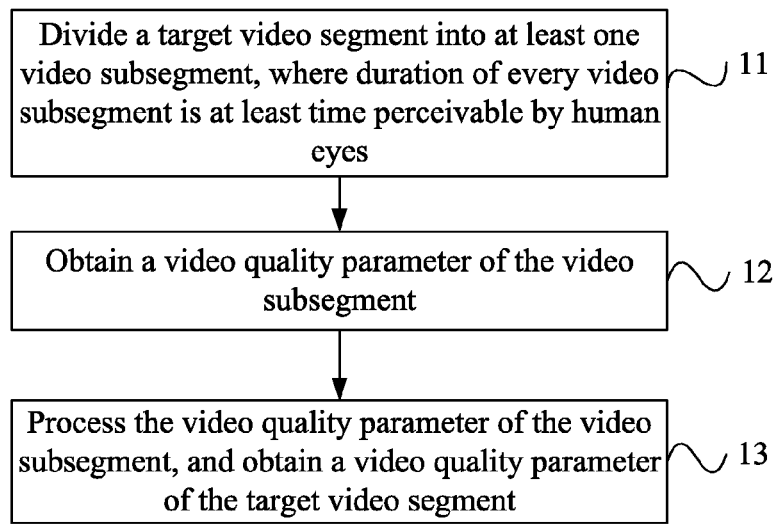
FIG. 1 is a schematic flowchart of a method according to a first embodiment of the present invention.

FIG. 1 is a schematic flowchart of a method according to a first embodiment of the present invention. The method includes a number of steps.

Step 11: A video quality parameter obtaining apparatus divides a target video segment into at least one video subsegment, where duration of each video subsegment is at least time perceivable by human eyes. The target video segment includes one or more than two video frames, the target video segment may be an entire video sequence, and may also be a part of a video sequence.

Human eyes do not perceive videos by using a video frame as a unit. Therefore, according to this embodiment, multiple video frames are combined into a video segment, which is in line with perception features of human eyes and is close to the subjective video quality evaluation method.

Methods for dividing the video sequence into the video segment may include the following two kinds. A first kind is to divide the video sequence according to group of picture (GOP) and a second kind is to divide the video sequence according to distortion and non-distortion.

Figure 2:
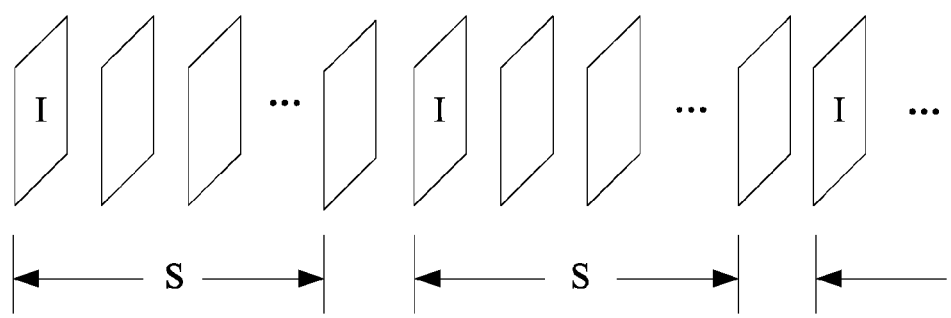
FIG. 2 is a schematic diagram of a first method for dividing a video segment according to a first embodiment of the present invention.

FIG. 2 is a schematic diagram of a first method for dividing a video segment according to a first embodiment of the present invention. As shown in FIG. 2, each GOP is used as a video subsegment (represented by S); a GOP is a group of pictures of a continuous I frame, P frame, and B frame. According to a video theory, when an I frame in a GOP or a P frame in the GOP is distorted, the distortion usually spreads continuously until the end of the GOP, namely, until arrival of the next I frame. Therefore, each GOP may be used as a video subsegment. Certainly, if the duration of a GOP is less than the time perceivable by human eyes, multiple GOPs may be combined into a video subsegment to meet perception requirements of human eyes.

Figure 3:
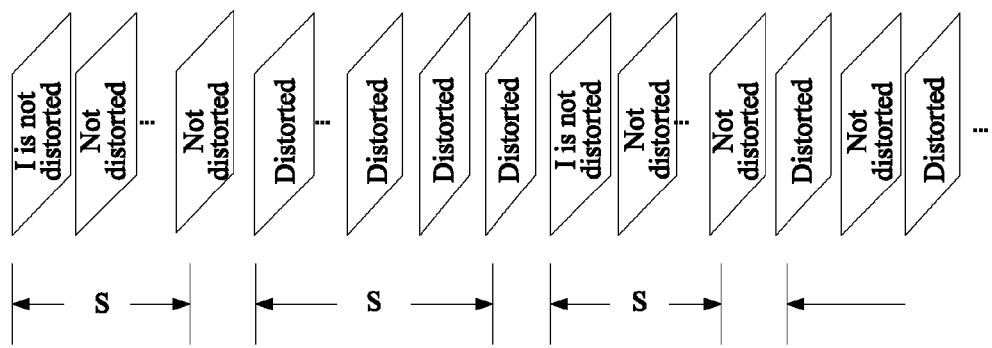
FIG. 3 is a schematic diagram of a second method for dividing a video segment according to a first embodiment of the present invention.

FIG. 3 is a schematic diagram of a second method for dividing a video segment according to a first embodiment of the present invention. As shown in FIG. 3, continuous and distorted video frames are used as a video subsegment (represented by S), and continuous and non-distorted video frames are used as another video subsegment. Human eyes can easily capture special contents in a video, for example, image distortion caused by compression, artifact effect caused by bit errors (that is artifact effect caused by packet lost or error propagation), pauses or skips caused by loss of video frames, and pauses caused by buffering. The foregoing symptoms are collectively referred to as distortion. In other words, human eyes pay more attention to a distorted part. Therefore, the target video segment may be divided according to the distortion. When the entire target video segment has stable quality without distortion fluctuation, a target video segment is a video subsegment; when the distortion of the target video segment fluctuates, continuous frames with similar distortion may forms a video subsegment. That is, distorted video frames and non-distorted video frames are divided into different video subsegments. Certainly, if the duration of the distorted video subsegment is less than the time perceivable by human eyes, the subsequent non-distorted video frames may also be combined into this distorted video subsegment.

Step 12: The apparatus obtains a video quality parameter of the video subsegment.

Specifically, according to a video quality parameter of a video frame in the video subsegment, the video quality parameter of a corresponding video subsegment may be calculated and obtained; or according to a packet loss rate in the video subsegment, the video quality parameter of a corresponding video subsegment is calculated and obtained.

Method 1: Calculate and obtain the video quality parameter of the corresponding video subsegment according to the video quality parameter of the video frame in the video subsegment. Different weighting coefficients (namely, weights) may be introduced for different video frames. The weights are in inverse proportion to the video quality parameter of the corresponding video frame.

It can be known according to the visual characteristics of human eyes, human eyes are vulnerable to impact of low-quality video frames. Therefore, the video quality parameter (or score) of the video segment largely depends on a video quality score of a video frame with low video quality. If a video frame has a lower video quality score, the video frame has a greater weight.

A formula may be:

$$SegScore_{curr\_seg} = \frac{\sum_{n \in curr\_seg}(Score_n \times T_n \times W_n^1)}{\sum_{n \in curr\_seg} T_n \times W_n^1};$$

or $$SegScore_{curr\_seg} = \frac{\sum_{n \in curr\_seg}(Score_n \times W_n^1)}{\sum_{n \in curr\_seg} W_n^1}.$$

In the foregoing formulas, $SegScore_{curr\_seg}$ is a video quality parameter of a current video subsegment, where the video quality parameter of the current video subsegment is to be calculated, $Score_n$ is a video quality parameter of an $n^{th}$ video frame in the current video subsegment, $T_n$ is duration of the $n^{th}$ video frame in the current video subsegment, and $W_n^1$ is a weighting coefficient of the $n^{th}$ video frame in the current video subsegment and is in inverse proportion to $Score_n$.

In specific scenarios, the video quality parameter of the corresponding video frame may be weighted according to duration of a single frame. The specific scenarios may be that, for example, distorted frames completely affected by packet loss and video frames not affected by packet loss are put in different video segments, or quality of each video segment is relatively stable and consistent. In this case, a formula may be:

$$SegScore_{curr\_seg} = \frac{\sum\limits_{n \in curr\_seg} (Score_n \times T_n)}{\sum\limits_{n \in curr\_seg} T_n}.$$

Definition of parameters in the formula is the same as those described above.

Method 2: Calculate and obtain the video quality parameter of the corresponding video subsegment according to the packet loss rate of the video frame in the video subsegment.

The video quality of a video segment is related to the packet loss rate of the video segment. The higher the packet loss rate, the lower the video quality of the video segment; on the contrary, the lower the packet loss rate, the higher the video quality of the video segment. A formula may be:

$$SegScore_{curr\_seg} = a + b \times \frac{1}{1 + \left(\frac{Ppl}{c}\right)^d}.$$

In the foregoing formula, $SegScore_{curr\_seg}$ is a video quality score of a current video subsegment, where the video quality score of the current video subsegment is to be calculated, Ppl is a packet loss rate of the current video subsegment, a is a minimum video quality score, b is a quality score when the video segment is affected by coding but no packet is lost, and c and d are parameters which are related to video content and are not limited. The video quality score may also be calculated according to the packet loss rate in other methods, which are not limited here.

Step 13: The apparatus processes the video quality parameter of the video subsegment, and obtains the video quality parameter of the target video segment.

Specifically, the video quality parameter of the video subsegment may be weighted. A weighted value of the video subsegment is in inverse proportion to the video quality parameter of the corresponding video subsegment.

Human eyes are vulnerable to impact of low-quality video segments. Therefore, the video quality parameter of the target video segment largely depends on the video quality parameter of the video subsegments with low video quality. That is, the lower the video quality that a video subsegment has, the greater the weight that the video subsegment has. Moreover, people tend to forget, and are deeply impressed by lately-watched video segments but has vague memory about video segments watched earlier. Therefore, weighting may be performed according to display time of the video subsegment, and a video subsegment closer to an evaluation point has a greater weight.

A formula may be:

$$Q_{sequence} = \frac{\sum\limits_{n \in sequence} (SegScore_n \times W_n^2 \times W_n^3)}{\sum\limits_{n \in sequence} W_n^2 \times W_n^3};$$

or $$Q_{sequence} = \frac{\sum\limits_{n \in sequence} (SegScore_n \times W_n^2)}{\sum\limits_{n \in sequence} W_n^2}.$$

In the foregoing formulas, $Q_{sequence}$ is the video quality parameter of the target video segment, $SegScore_n$ is a video quality parameter of an $n^{th}$ video subsegment, $W_n^2$ is a weighting coefficient of the $n^{th}$ video subsegment and is in inverse proportion to $SegScore_n$, and $W_n^3$ is another weighting coefficient of the $n^{th}$ video subsegment and is in inverse proportion to a difference value between current time and display time of the $n^{th}$ video subsegment.

Certainly, it may be understood that, in the foregoing formulas, only factors that affect video quality may be taken into consideration, namely, the weighting coefficient $W_n^3$ of the display time may not be included.

Alternatively, after an impact caused by duration of different video segments on the video quality is taken into consideration, a formula may be:

$$Q_{sequence} = \frac{\sum\limits_{n \in sequence} (SegScore_n \times W_n^2 \times W_n^3 \times T_n')}{\sum\limits_{n \in sequence} W_n^2 \times W_n^3 \times T_n'};$$

or $$Q_{sequence} = \frac{\sum\limits_{n \in sequence} (SegScore_n \times W_n^2 \times T_n')}{\sum\limits_{n \in sequence} W_n^2 \times T_n'}.$$

In the foregoing formulas, $T_n'$ is duration of the $n^{th}$ video subsegment, and definitions of other parameters are the same as those described above.

In this embodiment, the target video segment is divided into the video subsegment whose duration is at least the time perceivable by human eyes, and processing is performed by using the video subsegment as the unit, which is in line with the perception characteristics of human eyes; a greater weight is set for the video subsegment with lower video quality, which may be in line with the visual characteristics of human eyes, and therefore, may be closer to a result obtained through the subjective video quality evaluation method.

By taking other visual characteristics of human eyes into consideration, for example, in a scenario of dividing according to the GOP, if several continuous GOPs are seriously-distorted segments, human eyes actually perceive a large distorted segment. Therefore, the several continuous distorted GOP segments may be combined into one distorted segment, and a corresponding score is adjusted to an average value of the several continuous video segments; or, subjectively, videos with frequently-changed quality are more likely to arouse people's repulsion, and therefore, when a non-distorted segment exists between two distorted segments, a score of the non-distorted segment needs to be adjusted to a lower value, such as an average value of the three segments.

Figure 4:
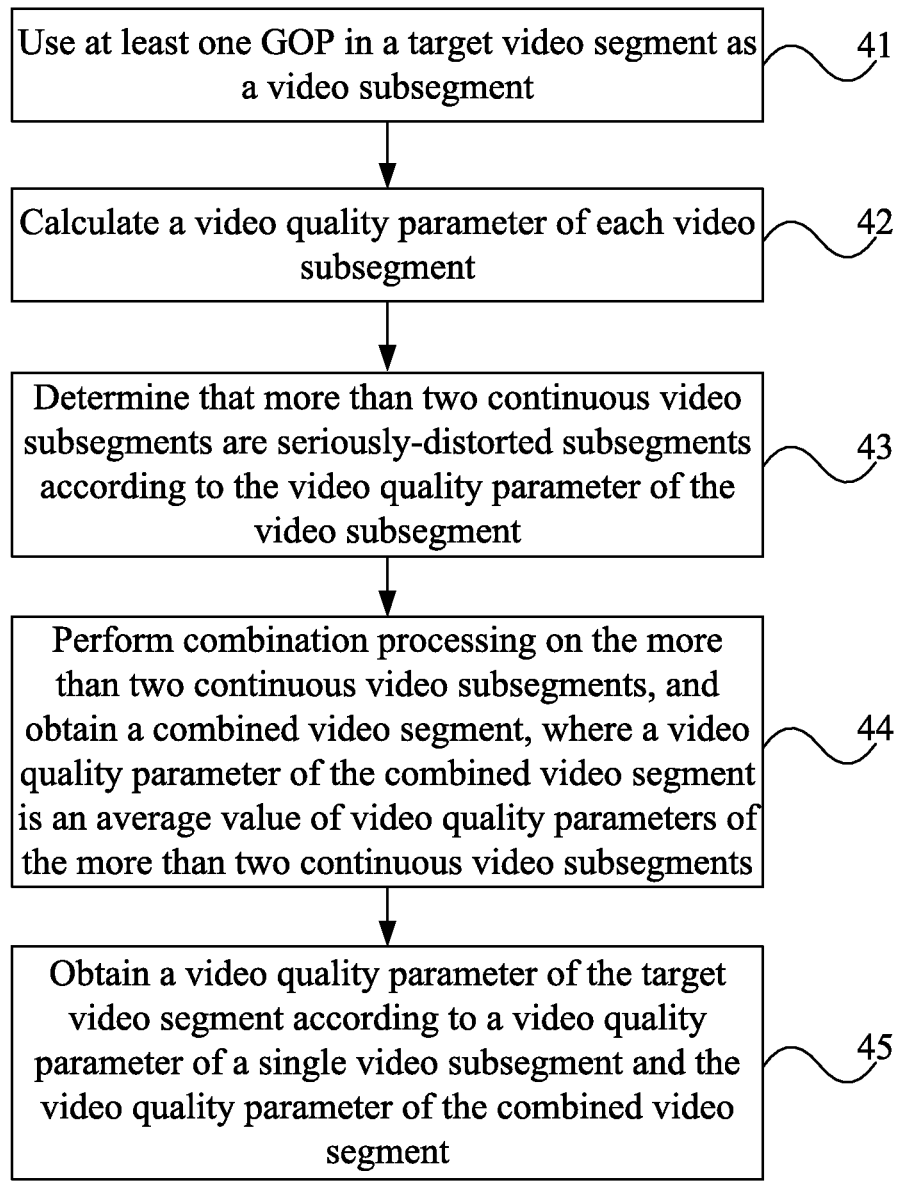
FIG. 4 is a schematic flowchart of a method according to a second embodiment of the present invention.

FIG. 4 is a schematic flowchart of a method according to a second embodiment of the present invention. The method includes a number of steps as described now.

Step 41: A video quality parameter obtaining apparatus uses at least one GOP in a target video segment as a video subsegment, where duration of each video subsegment is at least time perceivable by human eyes.

Step 42: The apparatus calculates a video quality parameter of each video subsegment.

Reference may be made to step 12 for the detailed formula, which is not repeatedly described here.

Step 43: The apparatus determines that more than two continuous video subsegments are seriously-distorted segments according to the video quality parameter of each video subsegment.

A threshold may be preset. When a video quality score of a video subsegment is lower than the threshold, the video subsegment is determined as a seriously-distorted segment.

Step 44: The apparatus performs combination processing on the more than two continuous video subsegments, and obtains a combined video segment. A video quality parameter of the combined video segment is an average value of video quality parameters of the more than two continuous video subsegments.

Step 45: The apparatus obtains a video quality parameter of the target video segment according to a video quality parameter of a single video subsegment and the video quality parameter of the combined video segment.

Reference may be made to step 13 for the detailed formula, which is not repeatedly described here.

In this embodiment, the continuous and seriously-distorted segments are combined into one video segment for processing, which is in line with visual characteristics of human eyes and makes a result closer to a result of a subjective video quality evaluation.

Figure 5:
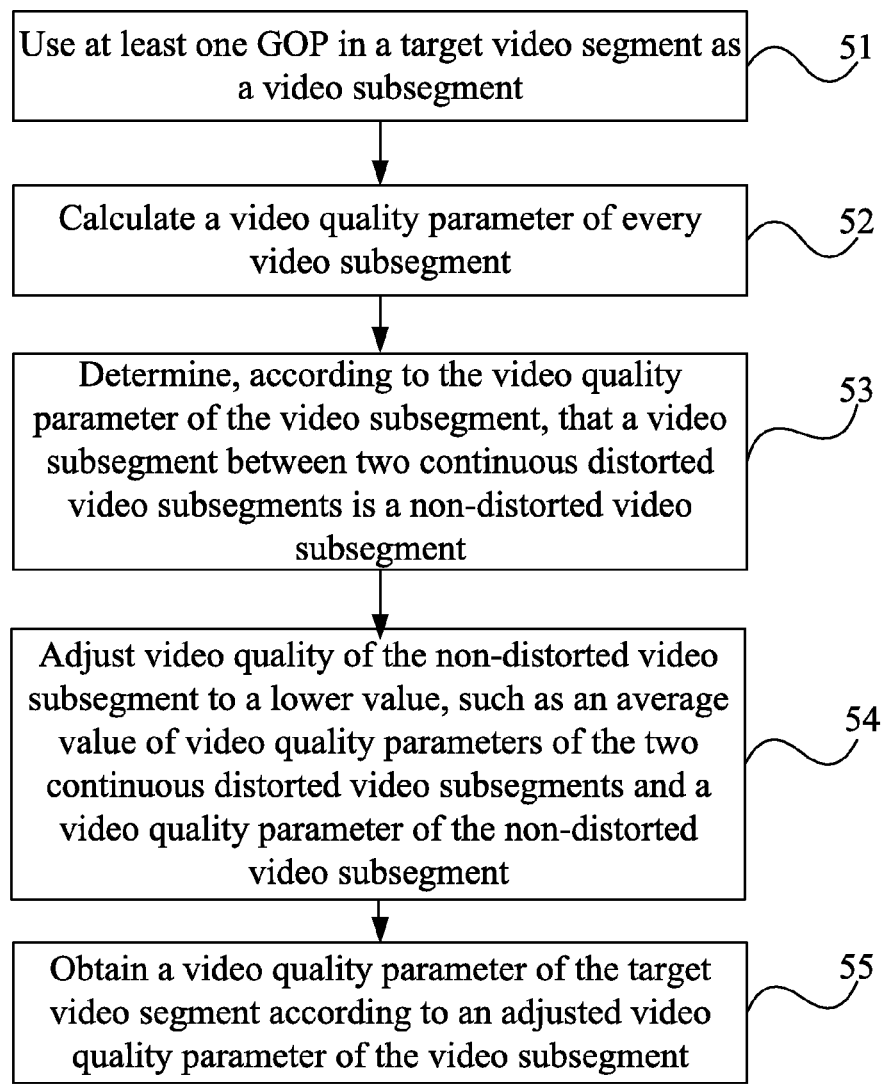
FIG. 5 is a schematic flowchart of a method according to a third embodiment of the present invention.

FIG. 5 is a schematic flowchart of a method according to a third embodiment of the present invention. The method includes:

Step 51: A video quality parameter obtaining apparatus uses at least one GOP in a target video segment as a video subsegment, where duration of each video subsegment is at least time perceivable by human eyes.

Step 52: The apparatus calculates a video quality parameter of each video subsegment.

Reference may be made to step 12 for the detailed formula, which is not repeatedly described here.

Step 53: The apparatus determines, according to the video quality parameter of each video subsegment, that a video subsegment between two continuous distorted video subsegments is a non-distorted video subsegment.

A threshold may be preset. If a video quality parameter of a video subsegment is lower than the threshold, the video subsegment is determined as a distorted segment; and, if a video quality parameter of a video subsegment is higher than the threshold, the video subsegment is determined as a non-distorted segment.

Step 54: The apparatus adjusts the video quality of the non-distorted video subsegment to a lower value, such as an average value of video quality parameters of the two continuous distorted video subsegments and a video quality parameter of the non-distorted video subsegment.

Step 55: The apparatus obtains a video quality parameter of the target video segment according to an adjusted video quality parameter of the video subsegment.

Reference may be made to step 13 for the detailed formula, which is not repeatedly described here.

According to this embodiment, a video quality score of the non-distorted segment between continuous distorted segments is adjusted to a lower value, which is in line with visual characteristics of human eyes, and makes a result closer to a result of a subjective video quality evaluation.

Figure 6:
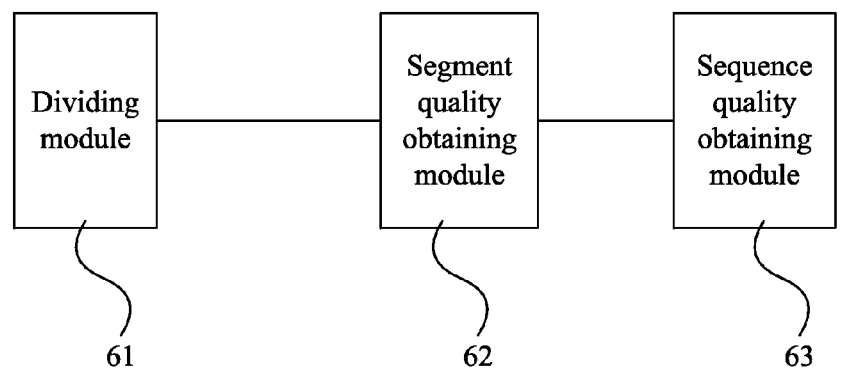
FIG. 6 is a schematic structural diagram of an apparatus for obtaining a video quality parameter according to a fourth embodiment of the present invention.

FIG. 6 is a schematic structural diagram of an apparatus for obtaining a video quality parameter according to a fourth embodiment of the present invention. The apparatus includes a dividing module 61, a segment quality obtaining module 62, and a sequence quality obtaining module 63. The dividing module 61 is configured to divide a target video segment into at least one video subsegment, where duration of each video subsegment is at least time perceivable by human eyes, and the target video segment includes one or more than two video frames. The segment quality obtaining module 62 is connected with the dividing module 61 and is configured to obtain a video quality parameter of the video subsegment. The sequence quality obtaining module 63 is connected with the segment quality obtaining module 62 and is configured to process the video quality parameter of the video subsegment, and obtain a video quality parameter of the target video segment.

The video quality parameter obtaining apparatus in this embodiment may be integrated in an integrated circuit or a chip, including a CPU, or digital signal processing (DSP), or a communication chip.

The dividing module 61 may include a first unit or a second unit. The first unit is configured to divide the target video segment according to the method that at least one group of picture is used as a video subsegment, where duration of the at least one group of picture is at least time perceivable by human eyes. The second unit is configured to divide the target video segment by using a continuous non-distorted video frame as a video subsegment and using a continuous distorted video frame as another video subsegment; alternatively, divide the target video segment by using a continuous non-distorted video frame as a video subsegment and using a continuous distorted video frame and a subsequent non-distorted video frame as another video subsegment, where duration of said another video subsegment may be at least time perceivable by human eyes.

The segment quality obtaining module 62 may include a third unit or a fourth unit. The third unit or the fourth unit is connected with the first unit or the second unit.

The third unit is configured to calculate and obtain a video quality parameter of a corresponding video subsegment according to a video quality parameter of a video frame in the video subsegment. In a detailed embodiment, when receiving the target video segment, the dividing module also receives a video quality parameter of each video frame in the target video segment, and then sends the video quality parameter of each video frame in the target video segment to the third unit. The third unit may calculate and obtain the video quality parameter of the video subsegment directly according to the video quality parameter of the video frame, and the third unit may also calculate the video quality parameter of each video frame first, and then calculate and obtain the video quality parameter of the video subsegment according to the calculated and obtained video quality parameter of the video frame. The fourth unit is configured to calculate and obtain the video quality parameter of the corresponding video subsegment according to a packet loss rate in the video subsegment. In a detailed embodiment, the fourth unit may measure a packet loss rate of each video subsegment, and then calculates and obtains the video quality parameter of the corresponding video subsegment.

Specifically, the third unit is configured to use the following formula, and calculate and obtain the video quality parameter of the corresponding video subsegment according to the video quality parameter of the video frame in the video subsegment:

$$SegScore_{curr\_seg} = \frac{\sum_{n \in curr\_seg}(Score_n \times T_n)}{\sum_{n \in curr\_seg} T_n};$$

or, $$SegScore_{curr\_seg} = \frac{\sum_{n \in curr\_seg}(Score_n \times T_n \times W_n^1)}{\sum_{n \in curr\_seg} T_n \times W_n^1};$$

or, $$SegScore_{curr\_seg} = \frac{\sum_{n \in curr\_seg}(Score_n \times W_n^1)}{\sum_{n \in curr\_seg} W_n^1}.$$

In the foregoing formulas, $SegScore_{curr\_seg}$ is a video quality parameter of a current video subsegment, where the video quality parameter of the current video subsegment is to be calculated, $Score_n$ is a video quality parameter of an $n^{th}$ video frame in the current video subsegment, $T_n$ is duration of the $n^{th}$ video frame in the current video subsegment, and $W_n^1$ is a weighting coefficient of $n^{th}$ video frame in the current video subsegment and is in inverse proportion to $Score_n$.

The fourth unit is configured to use the following formula, and calculate and obtain the video quality of the corresponding video subsegment according to the packet loss rate in the video subsegment:

$$SegScore_{curr\_seg} = a + b \times \frac{1}{1 + \left(\frac{Ppl}{c}\right)^d}.$$

In the foregoing formula, $SegScore_{curr\_seg}$ is a video quality score of a current video subsegment, where the video quality score of the current video subsegment is to be calculated, Ppl is a packet loss rate of the current video subsegment, a is a minimum video quality score, b is a quality score when the video segment is affected by coding but no packet is lost, and c and d are parameters which are related to video content and are not limited. The video quality score may also be calculated according to the packet loss rate in other methods, which are not limited here.

The sequence quality obtaining module 63 includes a weighting processing unit. The weighting processing unit is configured to perform weighting processing on the video quality parameter of the video subsegment, and obtain the video quality parameter of the target video segment. A weighted value of the video subsegment is in inverse proportion to the video quality parameter of the corresponding video subsegment, and the following formula may be applied:

$$Q_{sequence} = \frac{\sum_{n \in sequence}(SegScore_n \times W_n^2 \times W_n^3)}{\sum_{n \in sequence} W_n^2 \times W_n^3};$$

or, $$Q_{sequence} = \frac{\sum_{n \in sequence}(SegScore_n \times W_n^2 \times W_n^3 \times T_n')}{\sum_{n \in sequence} W_n^2 \times W_n^3 \times T_n'};$$

or, $$Q_{sequence} = \frac{\sum_{n \in sequence}(SegScore_n \times W_n^2)}{\sum_{n \in sequence} W_n^2};$$

or, $$Q_{sequence} = \frac{\sum_{n \in sequence}(SegScore_n \times W_n^2 \times T_n')}{\sum_{n \in sequence} W_n^2 \times T_n'}.$$

In the foregoing formulas, $Q_{sequence}$ is the video quality parameter of the target video segment, $SegScore_n$ is a video quality parameter of an $n^{th}$ video subsegment, $W_n^2$ is a weighting coefficient of the $n^{th}$ video subsegment and is in inverse proportion to $SegScore_n$, $W_n^3$ is another weighting coefficient of the $n^{th}$ video subsegment and is in inverse proportion to a difference value between current time and display time of the $n^{th}$ video subsegment, and $T_n'$ is duration of the $n^{th}$ video subsegment.

By taking other visual characteristics of human eyes into consideration, the segment quality obtaining module 62 may further include a fifth unit or a sixth unit. The fifth unit or the sixth unit is connected with the third unit or the fourth unit.

The fifth unit is configured to combine more than two continuous video subsegments into a combined video segment when determining, according to the video quality parameter of the video subsegment, that the more than two continuous video subsegments are seriously-distorted segments, and use an average value of video quality parameters of the more than two continuous video subsegments as the video quality parameter of the combined video segment.

The sixth unit is configured to use an average value of video quality parameters of more than two distorted video subsegments and a non-distorted video subsegment as the video quality parameter of the non-distorted video subsegment when determining, according to the video quality parameter of the video subsegment, that the non-distorted video subsegment exists between the two distorted video subsegments.

In this embodiment, the target video segment is divided into the video subsegment, and processing is performed by using the video subsegment as a unit, which is in line with perception characteristics of human eyes; a greater weight is set for a video subsegment with lower video quality, which is in line with visual characteristics of human eyes, and therefore, may be closer to a result obtained through a subjective video quality evaluation method.

Figure 7:
FIG. 7 is a schematic structural diagram of an electronic device according to a fifth embodiment of the present invention.

FIG. 7 is a schematic structural diagram of an electronic device according to a fifth embodiment of the present invention. The electronic device includes a transceiver apparatus 71 and a video quality parameter obtaining apparatus 72. The video quality parameter obtaining apparatus 72 may be the apparatus shown in FIG. 6, and is not repeatedly described here. The transceiver apparatus 71 is configured to execute at least one item of the following items: sending a target video segment and receiving a video quality parameter of the target video segment. It may be understood that, the transceiver apparatus may further provide other information, such as a video quality parameter of each video frame, to calculate and obtain a video quality parameter of a video subsegment.

The electronic device in this embodiment of the present invention may be a mobile phone, a video processing device, a computer or a server.

In this embodiment, the target video segment is divided into the video subsegment, and processing is performed by using the video subsegment as a unit, which is in line with perception characteristics of human eyes; a greater weight is set for a video subsegment with lower video quality, which is in line with visual characteristics of human eyes, and therefore, may be closer to a result obtained through a subjective video quality evaluation method.

Persons of ordinary skill in the art may understand that: all or part of the steps of the foregoing method embodiments may be implemented by a program instructing relevant hardware. The program may be stored in a computer readable storage medium. When the program is executed, the steps including the foregoing method embodiments are executed. The storage medium may be any medium that may store program codes, such as a ROM, a RAM, a magnetic disk, or an optical disk.

Finally, it should be noted that the foregoing embodiments are merely provided for describing the technical solutions of the present invention, but not intended to limit the present invention. Although the present invention is described in detail with reference to exemplary embodiments, it should be understood that: persons of ordinary skill in the art may still make modifications or equivalent replacements to the technical solutions of the present invention; however, these modifications or equivalent replacements cannot make the modified technical solutions depart from the spirit and scope of technical solutions of the present invention.

What is claimed is:

1. A method for obtaining a video quality parameter, the method comprising:
   dividing a target video segment into at least one video subsegment, wherein duration of every video subsegment is at least time perceivable by a human eye;
   obtaining a video quality parameter of the video subsegment; and
   processing the video quality parameter of the video subsegment to obtain a video quality parameter of the target video segment.

2. The method according to claim 1, wherein processing the video quality parameter of the video subsegment comprises performing a weighting processing on the video quality parameter of the video subsegment.

3. The method according to claim 2, wherein a weighted value of the video subsegment is in inverse proportion to the video quality parameter of a corresponding video subsegment.

4. The method according to claim 2, wherein a formula for performing weighting processing on the video quality parameter of the video subsegment is:

$$Q_{sequence} = \frac{\sum_{n \in sequence}(SegScore_n \times W_n^2 \times W_n^3)}{\sum_{n \in sequence} W_n^2 \times W_n^3};$$

or $$Q_{sequence} = \frac{\sum_{n \in sequence}(SegScore_n \times W_n^2 \times W_n^3 \times T_n')}{\sum_{n \in sequence} W_n^2 \times W_n^3 \times T_n'};$$

or $$Q_{sequence} = \frac{\sum_{n \in sequence}(SegScore_n \times W_n^2)}{\sum_{n \in sequence} W_n^2};$$

or $$Q_{sequence} = \frac{\sum_{n \in sequence}(SegScore_n \times W_n^2 \times T_n')}{\sum_{n \in sequence} W_n^2 \times T_n'};$$

wherein $Q_{sequence}$ is the video quality parameter of the target video segment, $SegScore_n$ is a video quality parameter of an $n^{th}$ video subsegment, $W_n^2$ is a weighting coefficient of the $n^{th}$ video subsegment, $W_n^3$ is another weighting coefficient of the $n^{th}$ video subsegment, and $T_n'$ is duration of the $n^{th}$ video subsegment.

5. The method according to claim 1, wherein dividing the target video segment into at least one video subsegment comprises dividing the target video segment by using at least one group of picture as a video subsegment, wherein duration of the at least one group of picture is at least the time perceivable by human eyes.

6. The method according to claim 1, wherein dividing the target video segment into at least one video subsegment comprises dividing the target video segment by using a continuous non-distorted video frame as a video subsegment and using a continuous distorted video frame as another video subsegment.

7. The method according to claim 1, wherein dividing the target video segment into at least one video subsegment comprises dividing the target video segment by using a continuous non-distorted video frame as a video subsegment and using a continuous distorted video frame and a subsequent non-distorted video frame as another video subsegment.

8. The method according to claim 1, wherein the obtaining the video quality parameter of the video subsegment comprises calculating and obtaining a video quality parameter of a corresponding video subsegment according to a video quality parameter of a video frame in the video subsegment.

9. The method according to claim 8, wherein a formula for calculating and obtaining the video quality parameter of the corresponding video subsegment according to the video quality parameter of the video frame in the video subsegment is:

$$SegScore_{curr\_seg} = \frac{\sum_{n \in curr\_seg}(Score_n \times T_n)}{\sum_{n \in curr\_seg} T_n};$$

or $$SegScore_{curr\_seg} = \frac{\sum_{n \in curr\_seg}(Score_n \times T_n \times W_n^1)}{\sum_{n \in curr\_seg} T_n \times W_n^1};$$

-continued $$SegScore_{curr\_seg} = \frac{\sum_{n \in curr\_seg}(Score_n \times W_n^1)}{\sum_{n \in curr\_seg} W_n^1};$$

wherein SegScore$_{curr\_seg}$ is a video quality parameter of a current video subsegment, wherein the video quality parameter of the current video subsegment is to be calculated, Score$_n$ is a video quality parameter of an n$^{th}$ video frame in the current video subsegment, T$_n$ is duration of the n$^{th}$ video frame in the current video subsegment, and W$_n^1$ is a weighting coefficient of the n$^{th}$ video frame in the current video subsegment.

10. The method according to claim 9, further comprising combining more than two continuous video subsegments into a combined video segment when determining, according to the video quality parameter of the video subsegment, that the more than two continuous video subsegments are a seriously-distorted segment, and using an average value of video quality parameters of the more than two continuous video subsegments as a video quality parameter of the combined video segment.

11. The method according to claim 9, further comprising using an average value of video quality parameters of more than two distorted video subsegments and a non-distorted video subsegment as a video quality parameter of the non-distorted video subsegment when determining, according to the video quality parameter of the video subsegment, that the non-distorted video subsegment exists between the two distorted video subsegments.

12. The method according to claim 1, wherein the obtaining the video quality parameter of the video subsegment comprises calculating and obtaining a video quality parameter of a corresponding video subsegment according to a packet loss rate in the video subsegment.

13. An apparatus for obtaining a video quality parameter, the apparatus comprising:
a dividing module, configured to divide a target video segment into at least one video subsegment, wherein duration of every video subsegment is at least time perceivable by a human eye;
a segment quality obtaining module, configured to obtain a video quality parameter of the video subsegment; and
a sequence quality obtaining module, configured to process the video quality parameter of the video subsegment, and obtain a video quality parameter of the target video segment.

14. The apparatus according to claim 13, wherein the sequence quality obtaining module comprises a weighting processing unit, which is configured to perform weighting processing on the video quality parameter of the video subsegment and to obtain the video quality parameter of the target video segment.

15. The apparatus according to claim 14, wherein a weighted value of the video subsegment is applied by the weighting processing unit and is in inverse proportion to the video quality parameter of a corresponding video subsegment.

16. The apparatus according to claim 14, wherein:
the weighting processing unit in the sequence quality obtaining module is configured to use the following formula, perform weighting processing on the video quality parameter of the video subsegment, and obtain the video quality parameter of the target video segment:

$$Q_{sequence} = \frac{\sum_{n \in sequence}(SegScore_n \times W_n^2 \times W_n^3)}{\sum_{n \in sequence} W_n^2 \times W_n^3};$$

or $$Q_{sequence} = \frac{\sum_{n \in sequence}(SegScore_n \times W_n^2 \times W_n^3 \times T_n')}{\sum_{n \in sequence} W_n^2 \times W_n^3 \times T_n'};$$

or $$Q_{sequence} = \frac{\sum_{n \in sequence}(SegScore_n \times W_n^2)}{\sum_{n \in sequence} W_n^2};$$

or $$Q_{sequence} = \frac{\sum_{n \in sequence}(SegScore_n \times W_n^2 \times T_n')}{\sum_{n \in sequence} W_n^2 \times T_n'};$$

wherein Q$_{sequence}$ is the video quality parameter of the target video segment, SegScore$_n$ is a video quality parameter of an n$^{th}$ video subsegment, W$_n^2$ is a weighting coefficient of the n$^{th}$ video subsegment, W$_n^3$ is another weighting coefficient of the n$^{th}$ video subsegment, and T$_n$' is duration of the n$^{th}$ video subsegment.

17. The apparatus according to claim 13, wherein the dividing module comprises a first unit or a second unit;
wherein the first unit is configured to divide the target video segment such that at least one group of picture is used as a video subsegment, wherein duration of the at least one group of picture is at least time perceivable by human eyes; and
wherein the second unit is configured to divide the target video segment by using a continuous non-distorted video frame as a video subsegment and using a continuous distorted video frame as another video subsegment or to divide the target video segment by using a continuous non-distorted video frame as a video subsegment and using a continuous distorted video frame and a subsequent non-distorted video frame as another video subsegment.

18. The apparatus according to claim 13, wherein the segment quality obtaining module comprises a third unit or a fourth unit;
wherein the third unit is configured to calculate and obtain a video quality parameter of a corresponding video subsegment according to a video quality parameter of a video frame in the video subsegment; and
wherein the fourth unit is configured to calculate and obtain a video quality parameter of a corresponding video subsegment according to a packet loss rate in the video subsegment.

19. The apparatus according to claim 18, wherein:
the third unit is configured to use the following formula, and calculate and obtain the video quality parameter of the corresponding video subsegment according to the video quality parameter of the video frame in the video subsegment:

$$SegScore_{curr\_seg} = \frac{\sum_{n \in curr\_seg}(Score_n \times T_n)}{\sum_{n \in curr\_seg} T_n};$$

or $$SegScore_{curr\_seg} = \frac{\sum_{n \in curr\_seg}(Score_n \times T_n \times W_n^1)}{\sum_{n \in curr\_seg} T_n \times W_n^1};$$

or $$SegScore_{curr\_seg} = \frac{\sum_{n \in curr\_seg}(Score_n \times W_n^1)}{\sum_{n \in curr\_seg} W_n^1};$$

wherein $SegScore_{curr\_seg}$ is a video quality parameter of a current video subsegment, wherein the video quality parameter of the current video subsegment is to be calculated, $Score_n$ is a video quality parameter of an $n^{th}$ video frame in the current video subsegment, $T_n$ is duration of the $n^{th}$ video frame in the current video subsegment, and $W_n^1$ is a weighting coefficient of the $n^{th}$ video frame in the current video subsegment.

20. The apparatus according to claim 19, wherein the segment quality obtaining module further comprises a fifth unit or a sixth unit;

wherein the fifth unit is configured to combine more than two continuous video subsegments into a combined video segment when determining, according to the video quality parameter of the video subsegment, that the more than two continuous video subsegments are a seriously-distorted segment, and to use an average value of video quality parameters of the more than two continuous video subsegments as the video quality parameter of the combined video segment; and wherein the sixth unit is configured to use an average value of video quality parameters of more than two distorted video subsegments and a non-distorted video subsegment as the video quality parameter of the non-distorted video subsegment when determining, according to the video quality parameter of the video subsegment, that the non-distorted video subsegment exists between the two distorted video subsegments.

\* \* \* \* \*